United States Patent [19]
Godard et al.

[11] 3,729,689
[45] Apr. 24, 1973

[54] TRAVELING WAVE EXCITED GAS LASER

[75] Inventors: Bruno Godard, Gif-sur-Yvette; Bernard Lacour, Villebon, both of France

[73] Assignee: Compagnie Generale D'Electricite, Paris, France

[22] Filed: Dec. 23, 1971

[21] Appl. No.: 211,374

[30] Foreign Application Priority Data

Dec. 30, 1970 France..............................7047312

[52] U.S. Cl. ...................331/94.5, 330/4.3, 333/21, 333/31, 343/781, 343/783, 343/785
[51] Int. Cl. .............................H01s 3/09, H01s 3/02
[58] Field of Search .......................331/94.5; 333/21, 333/31; 343/781, 783, 785; 330/4.3

[56] References Cited
UNITED STATES PATENTS 3,571,746   3/1971   De Temple et al..................331/94.5
3,571,745   3/1971   Actman et al......................331/94.5

OTHER PUBLICATIONS

Shipman, Jr., Applied Physics Letters, 10, (1), Jan. 1967, pp. 3–4.
Hodgson, Phys. Rev. Lett., 25 (8), 24 Aug. 1970, pp. 494–497.
Waynant et al. IEEE J. Quantum Electronics, Vol. QE–7, No. 6, June 1971, p. 282.

Primary Examiner—Ronald L. Wibert
Assistant Examiner—R. J. Webster
Attorney—Richard C. Sughrue et al.

[57] ABSTRACT

A gas laser in which the gaseous active medium is triggered by a plane progressive discharge wave generated by a flat electrical conductor.

21 Claims, 6 Drawing Figures

Patented April 24, 1973

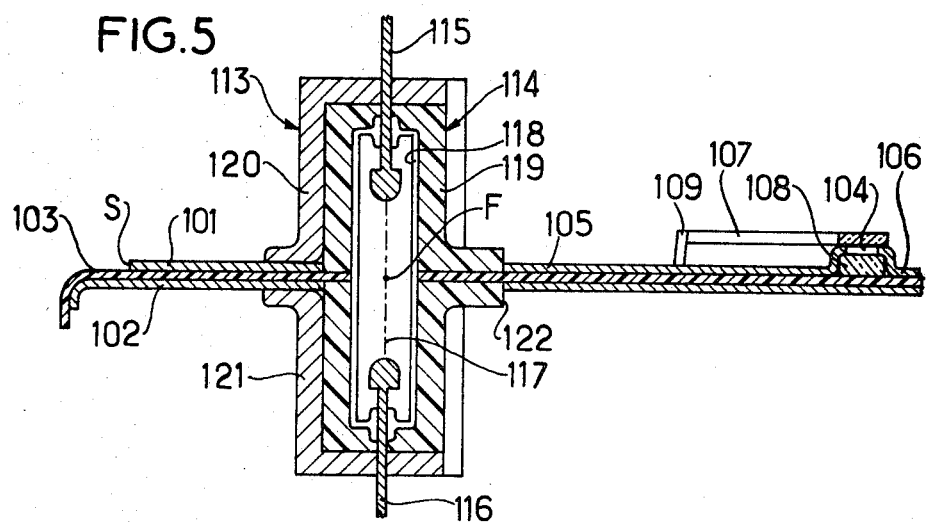
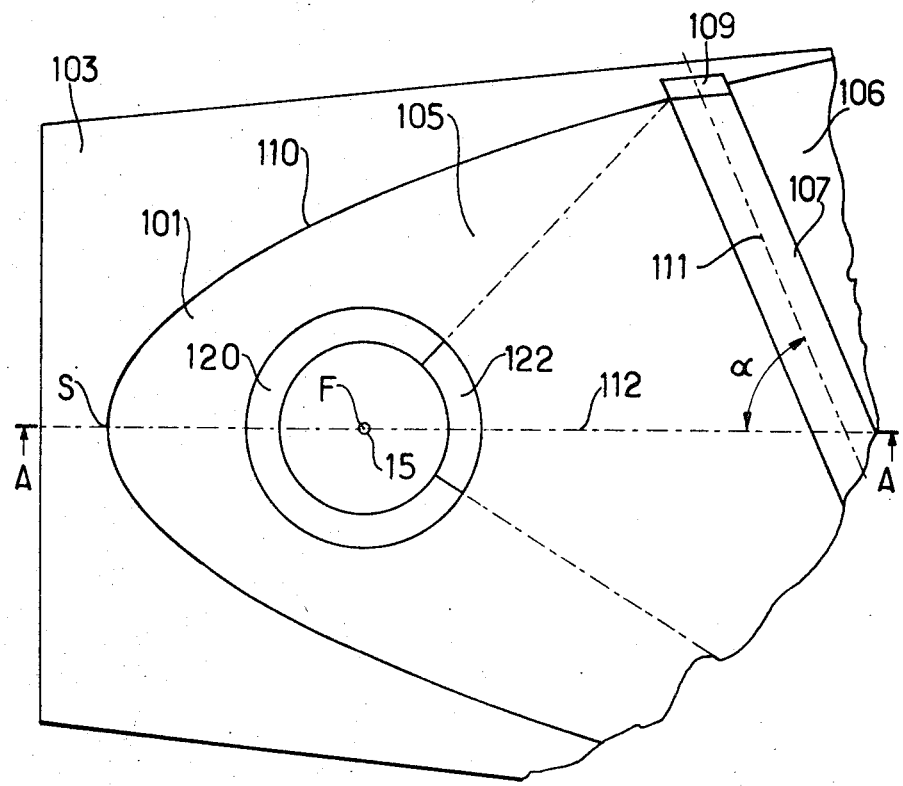

TRAVELING WAVE EXCITED GAS LASER

BACKGROUND OF THE INVENTION

The present invention relates to gas lasers and, more particularly, gas lasers where the stimulated emission is produced by an electric discharge in the gaseous medium.

A gas laser has been proposed which has a cavity containing the active gas, and where the electric discharge is produced by a progressive current wave. This current wave propagates in the active medium from one end of the cavity to the other at a speed equal to that of the speed of propagation of the stimulated emission in this cavity.

SUMMARY OF THE INVENTION

According to the present invention there is provided a laser including: an electric excitation line provided with an insulative plate sandwiched between a first metallic plate and a second metallic plate having one edge formed as a parabola whose axis of symmetry makes a non-zero angle with the axis of a channel for receiving an active medium and dividing the first plate into two distinct portions; and a substantially point source of current waves at the focus of the parabola.

BRIEF DESCRIPTION OF THE DRAWINGS

The invention will now be described in more detail, by way of examples only, with reference to the accompanying diagrammatic drawings in which:

FIG. 5 shows a cross-section of a third embodiment of a laser of the present invention; and FIG. 6 is a plan view of the laser of FIg. 5.

DESCRIPTION OF THE PREFERRED EMBODIMENTS

Figure 1:
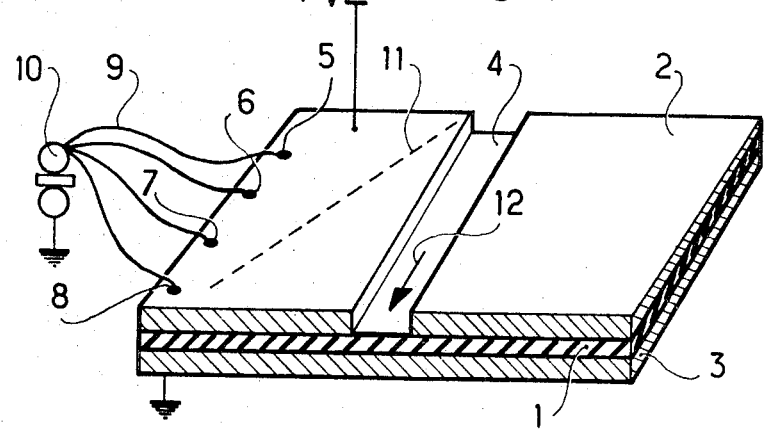
FIG. 1 is a perspective view of a known gas laser.

Referring to FIG. 1, the gas laser has a flat electric line provided by an insulative plate 1 sandwiched between two parallel metal plates 2 and 3 held at different potentials.

A channel 4 divides the plate 2 into two distinct portions. The channel 4 receives a gaseous medium at atmospheric pressure. The gaseous medium can be one of the constituents of air, for example, nitrogen.

Point sources 5, 6, 7 and 8 for producing electric discharges in the insulating plate 1 are aligned along a line parallel to the axis of the channel 4. These discharge sources are connected to a pulse generator 10 by coaxial cables, one of which is shown at 9.

These coaxial cables have different lengths and form variable delay lines transmitting successively a pulse from the generator 10 to the sources 5, 6, 7 and 8. The envelope of the spherical surfaces of the discharge waves created in the dielectric at the point sources 5, 6, 7 and 8 is a surface of a progressive wave shown by the line 11 and it makes an angle $(\pi/2) - \alpha$ with the axis 12 of the channel 4.

As the surface of the wave 11 progresses, different points of the wave front arrive at the active medium, excite it, and produce a stimulated emission propagating along the axis 12 of the channel 4.

For maximum power output of the laser, the speed of propagation of the discharge wave in the direction 12 should be constant and the angle between the surface of the wave 11 and the direction 12 should be such that the speed of propagation of the discharge wave is equal to the speed of propagation of stimulated emission in the direction 12.

These conditions cannot be realized with the known laser, particularly as the progressive wave produced by the line is not strictly plane. By using a large number of discharge sources, a resulting wave which is substantially plane can be produced but this necessitates the use of complicated pulse generators.

Figure 2:
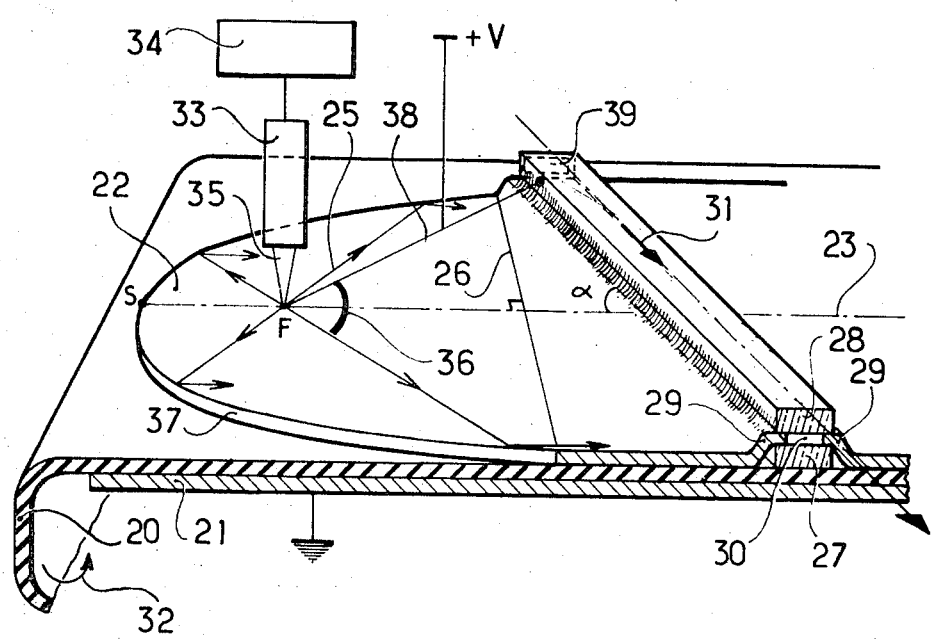
FIG. 2 is a perspective view of a gas laser constructed in accordance with the present invention.

Referring to FIG. 2, the gas laser of the present invention includes a flat line provided by an insulative plate 20 sandwiched between a first metallic plate 21 and a second metallic plate 22 held at different potentials. The insulative plate 20 is in the form of a sheet which can be rolled up at one end 32 by a mechanical device (not shown) which pulls it through the plates. The second plate 22 has one edge in the form of a parabola 37 having an axis of symmetry 23, a focus F and turning point S.

An auxiliary laser 33 controlled by electronic circuitry 34 emits light pulses 35 focused on the focus F of the parabola 37. The laser 33 is arranged so that its beam has sufficient energy to pierce the metal plate 22 and the insulative plate 20. Alternatively, the metal plate 22 can have a cylindrical hole formed at the focus F and, in this case, the energy of the laser beam must be sufficient to pierce the insulative plate 20.

The time for the discharge wave front to build up is preferably less than twice the propagation time of a discharge wave in the flat line for its travel from the focus F to the point S of the parabola. This time is in the order of 1 nanosecond.

A channel 30 for receiving an active medium divides the plate 22 into two distinct portions. The edges of the portions of the plate 22 bordering the channel are sandwiched between two insulative strips 28 and 27 so as to leave a gap 30 for containing the active medium. These edges are bent outwardly to accommodate the strip 27 and form elbows 29. The ends of channel 30 are closed by two windows, one of which is shown at 39.

If the gaseous active medium is air under atmospheric pressure, the channel 30 need not be closed and the strips 27 and 28 and windows 39 are not necessary.

The cosine of the angle $\alpha$ between the axis of symmetry of the parabola 37 and the axis 31 of the channel 39 is equal to the ratio of the component of the speed of propagation of a discharge wave in the line in the direction of the axis 23 to the speed of propagation of stimulated emission in the direction 31 of the channel 30. The ends of the channel 30 cut the plate 22 at two points of the parabola 37.

A reflector 36 on the side of the plate remote from the point S is formed by an arcuate hole in the plate 22, the center of curvature of the arc being the point F. The length of the arc is limited by two lines joining the point F to the ends of the channel 30, one such line being shown at 38.

The operation of the laser shown in FIG. 2 will now be described.

At a given moment in time, the laser 33 emits a light impulse which pierces the plate 20 at the focus F of the parabola 37. The discharge wave emitted has a symmetry of revolution in relation to the focus F. The fraction of the surface of the discharge wave being included in the angle defined by the line 38 and its counterpart is reflected by the reflector 36. All waves emitted from the focus F are therefore directed towards the parabola 37 and are reflected off the parabola. A parabola is perfectly stigmatic for two conjugate points, its focus F and infinity. The surface of the wave coming from F is reflected by the parabola and is therefore a surface of a wave perfectly plane and perpendicular to the axis 23 of the parabola 37, shown by the line 26.

Successive points of the discharge wave 26, therefore, arrive successively at the channel 30 and stimulate the atoms or molecules of the active gas. Stimulated emission, therefore, occurs progressively from one end of the channel to the other in the direction of the arrow 31 and at the same speed as the progressive wave 26 in the direction of this channel. This condition enables a powerful coherent laser beam to be produced at the end of the channel 30.

The laser can be easily constructed and requires only one point discharge source. The electrical supply of the discharge line is therefore considerably simplified. Furthermore, the surface of the discharge wave has fewer aberrations than that of gas lasers that have been proposed. After the emission of a laser pulse, the sheet 20 is pulled between the plates 21 and 22, by winding it up at 32, so as to move the hole in the plate 20 out of the region bounded by the parabola and the channel.

As an alternative to the laser 33, a mechanical tool for piercing the plate 20, a voltage generator for producing an electrical discharge in the plate 20 at the focus F, or a similar device may be used.

Figure 3:
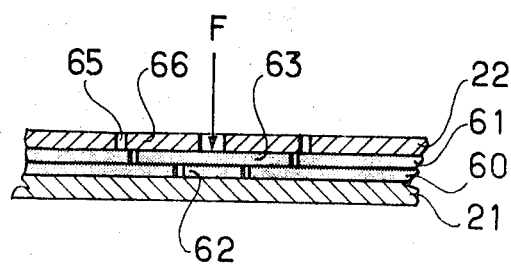
FIG. 3 shows in cross-section a flat excitation line.

The placing of the plate 20 can be a long and difficult operation, and a line structure as shown in FIG. 3 can alleviate this disadvantage.

Referring to FIG. 3, the plate 20 comprises two dielectric sheets 60 and 61 superimposed on each other. At the focus F of the parabola, the metallic plate 22 has a cylindrical hole 65 in which is placed a metallic disc 66 having a further hole at the focus F.

The sheets 60 and 61 have two further holes under the hole 65 which are filled by discs 62 and 63, the disc 63 having a diameter greater than that of the disc 62. The interstices between the discs can be filled with an insulative grease.

After discharge, the discs may be replaced, it being unnecessary to displace the dielectric plate.

Figure 4:
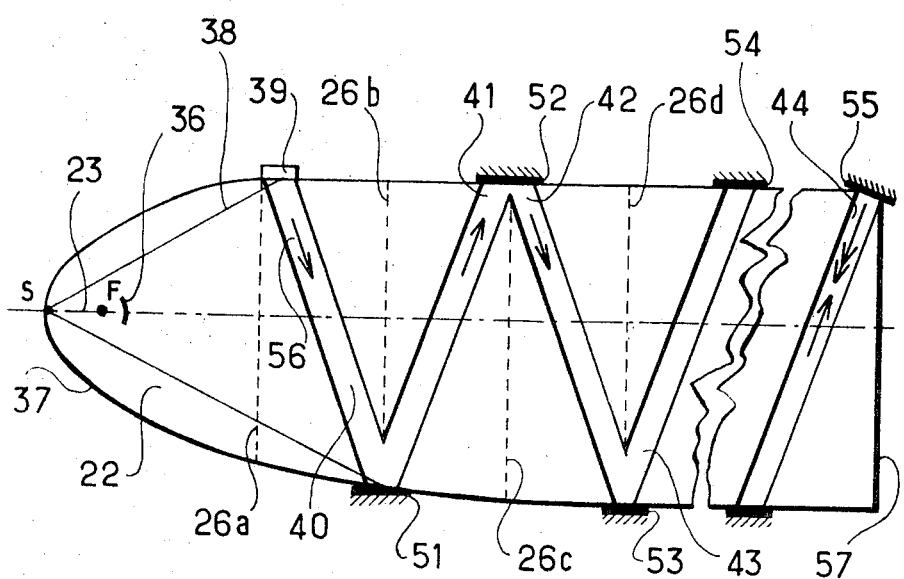
FIG. 4 shows a second embodiment of a laser according to the present invention.

Referring to the embodiment of FIG. 4, the laser has an excitation line with a plate 22 having a parabolic edge 37, a focus F, a turning point S, and a reflector 36. The laser has several channels of which four are shown at 40, 41, 42, 43 and 44. These channels lie across the plate and make oblique angles with the axis of the parabola. The channels communicate at the edges of the plate and are optically connected together with the aid of mirrors 51, 52, 53, 54. The last two channels on either side of the broken line are not shown connected together to indicate that the number of communicating channels may be chosen to meet the requirements of a particular situation.

Successive positions of the surface of a discharge wave are shown by the dotted lines 26a, 26b, 26c, 26d. This wave surface makes a constant angle with the laser tubes and thus successively causes stimulated emission along the laser path. The final mirror 55 can be semi-transparent to allow the laser beam to pass. Alternatively, it can be totally reflecting and orientated at right angles to the axis of the tube 44. The discharge wave is reflected by the end 57 of the line and re-excites in the same condition as the active media of the laser tubes (in the sense of the double arrow).

Such an excitation flat line allows very rapid excitation of energy levels of a gas, such as hydrogen or nitrogen, thus allowing the obtention of ultra-violet radiation.

Although good results may be obtained with this triggering circuit, nevertheless after each firing of the laser it is necessary to replace the dielectric separating the two metallic plates at the focus.

The laser shown in FIGS. 5 and 6 alleviates this disadvantage.

Referring to FIGS. 5 and 6, an insulative material 103 is sandwiched between two metallic plates 101 and 102, the metallic plates 101 and 102 being substantially parallel. A channel 104 divides the plate 101 into two distinct portions 105 and 106. This channel 104 forms a cavity containing an active gaseous medium. It is closed in a gas-tight manner by two dielectric plates 107 and 108 and closed at its ends by two windows, one of which is shown at 109. The plate 101 has its edge 110 cut into the form of a parabola having a focus F and turning point S, the channel 104 being positioned in the plate 101 so that it is on a side of the focus F remote from the point S. The axis 111 of the channel 104 makes a non-zero angle with the axis of the parabola.

The laser has a trigger circuit 113 provided by a chamber 114 containing an active gas, for example a mixture of nitrogen and hydrogen, or nitrogen and sulphur hexafluoride $SF_6$, the two electrodes 115 and 116 are disposed in the cavity, a common axis 117 of the electrodes passing through the focus F of the parabola bounded by the end 110 of the plate 101. The cavity 114 crosses the plates, 101, 103 and 102, and is made of a dielectric material. This cavity has an interior envelope 111 of glass, on the wall of which are fixed the electrodes 115 and 116, and a second outer envelope 119 made preferably of a material molded around the interior envelope 118.

In order to avoid electric discharges between the plate 101 and the plate 102, the dielectric material plate 103 penetrates the outer envelope 119 just up to the interior envelope 118, so that one part of the lateral exterior surface of the outer envelope 119 overlaps the part of the dielectric plate which is situated at the periphery of the interior envelope 118. The laser also includes means for electrically connecting electrodes 115 and 116 to respective metal plates 101 and 102, preferably so that the electrical path between the electrodes and plates are equal. These connections are made by two metallic parts 120 and 121 connected from the electrodes 115 and 116 to the respective metal plates 101 and 102. These metal parts are placed only on the side of the chamber facing the focus F. On the side of the chamber remote from the focus F, a high impedance 122 separates the two metallic plates. This impedance 122 is a part of the dielectric material forming the outer envelope 119. In this way the electric wave originating substantially from the focus F does not propagate directly towards the channel 104, but it is reflected on the parabolic edge 110 of the plate before arriving at the channel 104.

What is claimed is:

1. A traveling wave transmission line system for excitation of a laser having an active laser medium comprising: a first substantially flat, electrically conductive metallic plate; a second substantially flat, electrically conductive metallic plate separated from, and substantially parallel to, said first metallic plate and having a discharge channel for receiving an active laser medium therein and for dividing said second metallic plate into two distinct portions, each portion forming an end of a transmission line; an insulative plate sandwiched between said first and second metallic plates to form said transmission line; said second metallic plate at a first end thereof being formed as a parabola with an axis of symmetry at an angle to the longitudinal axis of said channel; a substantially point source of electric waves located at the focus of the parabola; pulse charge excitation means coupled to said first end of said transmission line and including means for shorting said line to produce said electric waves at said focus for reflection from said parabolic surface toward said channel in a plane waveform perpendicular to said axis of symmetry of said parabola.

2. A transmission line system as claimed in claim 1, further comprising a first insulative strip on said second metallic plate and covering said channel.

3. A transmission line system as claimed in claim 2, further comprising a second insulative strip placed in said channel and on said insulative plate so as to leave a gap between said second and said first insulative strips for containing the active medium.

4. A transmission line system as claimed in claim 3 wherein the edges of said second metallic plate bordering said channel are bent away from said insulative plate and are sandwiched between said first and second insulative strips.

5. A transmission line system as claimed in claim 2, wherein said channel contains the active medium, and further comprising insulative windows closing both ends of said channel and transparent to laser radiation emitted by the active medium.

6. A transmission line system as claimed in claim 2, wherein the cosine of the angle between the axis of symmetry of the parabola and the axis of said channel is equal to the ratio of the component of the speed of propagation of the current waves along the axis of symmetry of the parabola to the speed of propagation of stimulated emission along the axis of the channel.

7. A transmission line system as claimed in claim 1, wherein said second metallic plate has at least two channels whose axes make oblique angles with the axis of symmetry of the parabola, consecutive channels being optically joined at one end so as to form an optical path zigzagging across said second metallic plate.

8. A transmission line system as claimed in claim 7 wherein the final channel is closed by a mirror whose normal lies along said final axis of the channel.

9. A transmission line system as claimed in claim 1 wherein a cylindrical hole is bored in said second metallic plate at the focus of the parabola.

10. A transmission line system as claimed in claim 9 wherein said second metallic plate has a wave reflector formed by an arcuate hole whose center of curvature lies at the focus of the parabola, the turning point of the parabola and arc of the circle being disposed on either side of the focus.

11. A transmission line system as claimed in claim 9 wherein said shorting means comprises means for piercing said insulative plate at the focus of the parabola.

12. A transmission line system as claimed in claim 11, wherein said piercing means comprises a laser for directing a light pulse onto the focus of the parabola.

13. A transmission line system as claimed in claim 1 wherein said insulative plate is replaceable.

14. A transmission line system as claimed in claim 9, wherein said insulative plate is formed by two dielectric plates superimposed on each other and having respective cylindrical holes whose diameters are different than that of said hole in said second metallic plate, the holes in the dielectric plates being filled with removable dielectric discs.

15. A transmission line system as claimed in claim 1 wherein said excitation means comprises a chamber passing through a hole in said first and second metallic plates and said insulative plate, said chamber containing a gaseous medium and two electrodes having a common axis which passes through the focus of the parabola, said electrodes being connected to the respective metallic plates.

16. A transmission line system as claimed in claim 15 further comprising metallic members formed on the outer surface of said chamber for connecting said electrodes to the respective metallic plates.

17. A transmission line system as claimed in claim 15 wherein said electrodes are equi-distant from the focus.

18. A transmission line system as claimed in claim 17, wherein the electric paths connecting the electrodes to said respective plates are equal.

19. A transmission line system as claimed in claim 15, wherein the wall of said chamber is a dielectric and the chamber side remote from the focus of the parabola presents a high impedance to an electric wave originating at the focus of the parabola so that the electric wave is propagated towards the parabola and not directly towards said channel.

20. A transmission line system as claimed in claim 15 wherein the said chamber has both an interior envelope and an outer envelope.

21. A transmission line system as claimed in claim 20 wherein said outer envelope is of a dielectric material molded on said inner envelope.

* * * * *